United States Patent
Ito et al.

(10) Patent No.: US 9,466,855 B2
(45) Date of Patent: Oct. 11, 2016

(54) ADDITIVE FOR SODIUM ION SECONDARY BATTERY AND SODIUM ION SECONDARY BATTERY

(75) Inventors: Atsushi Ito, Ebina (JP); Yasuhiko Ohsawa, Yokosuka (JP); Shinichi Komaba, Tokyo (JP)

(73) Assignees: NISSAN MOTOR CO., LTD., Yokohama-Shi (JP); TOKYO UNIVERSITY OF SCIENCE EDUCATIONAL FOUNDATION ADMINISTRATIVE ORGANIZATION, Tokyo (JP)

( * ) Notice: Subject to any disclaimer, the term of this patent is extended or adjusted under 35 U.S.C. 154(b) by 27 days.

(21) Appl. No.: 14/007,250

(22) PCT Filed: Mar. 8, 2012

(86) PCT No.: PCT/JP2012/055921
§ 371 (c)(1),
(2), (4) Date: Sep. 24, 2013

(87) PCT Pub. No.: WO2012/132813
PCT Pub. Date: Oct. 4, 2012

(65) Prior Publication Data
US 2014/0017574 A1   Jan. 16, 2014

(30) Foreign Application Priority Data

Mar. 28, 2011 (JP) ................. 2011-070344
Jul. 27, 2011 (JP) ................. 2011-164334
Feb. 2, 2012 (JP) ................. 2012-020828

(51) Int. Cl.
| | |
|---|---|
| H01M 6/16 | (2006.01) |
| H01M 10/0567 | (2010.01) |
| H01M 4/36 | (2006.01) |
| H01M 4/587 | (2010.01) |
| H01M 10/054 | (2010.01) |

(52) U.S. Cl.
CPC ......... *H01M 10/0567* (2013.01); *H01M 4/366* (2013.01); *H01M 4/587* (2013.01); *H01M 10/054* (2013.01); *H01M 2300/0025* (2013.01)

(58) Field of Classification Search
CPC ......... H01M 10/054; H01M 10/0567; H01M 2300/0025; H01M 4/366; H01M 4/587
USPC ........ 429/306, 326, 329, 331, 337, 338, 215
See application file for complete search history.

(56) References Cited

U.S. PATENT DOCUMENTS

| | | |
|---|---|---|
| 2009/0053613 A1 | 2/2009 | Inoue et al. |
| 2011/0200848 A1* | 8/2011 | Chiang ............... B60L 11/1875 429/4 |

FOREIGN PATENT DOCUMENTS

| | | |
|---|---|---|
| JP | 2006-216508 A | 8/2006 |
| JP | 2009-123707 A | 6/2009 |

(Continued)

*Primary Examiner* — Patrick Ryan
*Assistant Examiner* — Ben Lewis
(74) *Attorney, Agent, or Firm* — Foley & Lardner LLP

(57) ABSTRACT

An additive for a sodium ion secondary battery of the present invention includes a compound of at least one of a saturated cyclic carbonate having a fluoro group and a chain carbonate having a fluoro group. A sodium ion secondary battery (1) of the present invention includes: a non-aqueous electrolytic solution including the additive for a sodium ion secondary battery and a non-aqueous solvent containing a saturated cyclic carbonate or a non-aqueous solvent containing a saturated cyclic carbonate and a chain carbonate; a positive electrode (11); and a negative electrode (12) that includes a coating formed in a surface of the negative electrode, the coating containing a composite material having carbon, oxygen, fluorine and sodium in the surface and includes a negative-electrode active material containing a hard carbon.

2 Claims, 4 Drawing Sheets

(56) References Cited

FOREIGN PATENT DOCUMENTS

| JP | 2010-165674 A | 7/2010 |
| JP | 2010-262905 A | 11/2010 |
| JP | 2009-199087 | * 3/2011 ............ H01M 4/485 |
| JP | 2011-49126 A | 3/2011 |
| JP | 2012-18801 A | 1/2012 |

* cited by examiner

US 9,466,855 B2

ADDITIVE FOR SODIUM ION SECONDARY BATTERY AND SODIUM ION SECONDARY BATTERY

TECHNICAL FIELD

The present invention relates to an additive for sodium ion secondary batteries and a sodium ion secondary battery. More specifically, the present invention relates to an additive for sodium ion secondary batteries which is capable of increasing the durability of the batteries and a sodium ion secondary battery including the same.

BACKGROUND ART

In recent years, as countermeasures for air pollution and global warming, it has been eagerly desired to reduce carbon oxide emissions. In the auto industry, introduction of electric vehicles (EVs) and hybrid electric vehicles (HEVs) has been expected to reduce carbon oxide emissions, and secondary batteries for driving motors, which are key devices in putting EVs and HEVs into practical use, are being actively developed. As the secondary batteries for driving motors, lithium ion secondary batteries having high theoretical energy are attracting attention and are now being developed rapidly. However, lithium is not in more abundant supply than sodium, for example, and is expensive. Accordingly, sodium ion secondary batteries are currently being developed for the purposes of achieving reduction of cost and stable supply of batteries.

Conventionally-proposed electrolytic solutions for sodium ion batteries are capable of including as the positive-electrode active material, substances which have low viscosity and high specific electric conductivity; are hardly decomposed even with high electrical potential; and are charged and discharged in the region of high positive electrical potential. For example, proposed is an electrolytic solution for sodium ion batteries that contains one of a chain saturated hydrocarbon dinitrile compound and a nitrile compound such as a chain cyanoether compound and cyanoacetate ester, and at least one of a cyclic carbonate, a cyclic ester, and a chain carbonate (see PTL 1).

CITATION LIST

Patent Literature

PTL 1: Japanese Patent Laid-open Publication No. 2010-165674

SUMMARY OF INVENTION

In a sodium ion battery including the electrolytic solution for sodium ion batteries according to PTL 1, decomposition of the electrolytic solution at high positive electrical potential can be reduced by a devise of the battery configuration, but decomposition of the electrolytic solution on the surface of the negative electrode cannot be reduced. Moreover, the decomposition products of the electrolytic solution on the surface of the positive electrode cannot be prevented from being further decomposed. Accordingly, the sodium ion battery lacks in durability.

The present invention was made in the light of the above-described problems involved in the conventional techniques. An object of the present invention is to provide an additive for sodium ion secondary batteries capable of increasing the durability of the sodium ion secondary batteries and a sodium ion secondary battery including the same.

An additive for sodium ion secondary batteries of the present invention includes: a compound of at least one of a saturated cyclic carbonate having a fluoro group and a chain carbonate having a fluoro group.

Moreover, a sodium ion secondary battery of the present invention includes: a non-aqueous electrolytic solution that includes the aforementioned additive for sodium ion secondary batteries, and one of a non-aqueous solvent containing a saturated cyclic carbonate and a non-aqueous solvent containing a saturated cyclic carbonate and a chain carbonate; a positive electrode; and a negative electrode that includes a coating formed on the surface of the negative electrode, the coating containing a composite material containing carbon, oxygen, fluorine and sodium, and that includes a negative-electrode active material containing a hard carbon.

DESCRIPTION OF EMBODIMENTS

Figure 1:
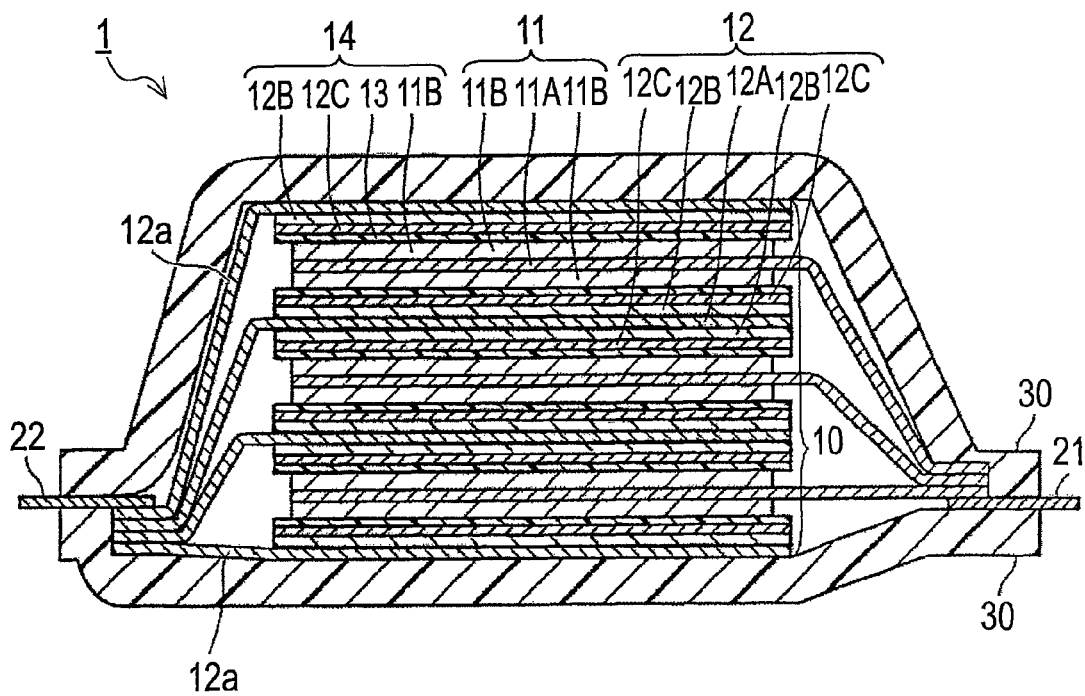
FIG. 1 is a schematic cross-sectional view illustrating an example of a sodium ion secondary battery according to an embodiment of the present invention.

Hereinafter, a description is given of an additive for sodium ion secondary batteries and a sodium ion secondary battery according to the present invention in detail.

First, a description is given of an additive for sodium ion secondary batteries according to an embodiment of the present invention in detail. The additive for sodium ion secondary batteries includes at least one selected from a group consisting of a saturated cyclic carbonate including a fluoro group and a chain carbonate including a fluoro group.

During the initial charging, the aforementioned additive is reduced and decomposed on the surface of the negative electrode prior to the reduction and decomposition of non-aqueous solvent constituting the non-aqueous electrolytic solution and contributes to formation of coating on the surface of the negative electrode. In a sodium ion secondary battery including the aforementioned additive, the formed coating reduces decomposition of the non-aqueous solvent, thus reducing the reduction in capacity. That is to say, the sodium ion secondary battery including the aforementioned additive has higher durability. This coating is called a solid electrolyte interface, that is, SEI, which is described in detail later.

If the coating is not formed, the electrolytic solution is decomposed on the negative electrode, which results in the generation of sodium ethoxide and the like. When these by-products are oxidized and decomposed on the positive electrode, decomposition of the electrolytic solution is further promoted. For example, addition of a saturated cyclic carbonate including a fluoro group, such as fluoroethylene carbonate (FEC), inhibits the generation process of sodium ethoxide and the like and therefore reduces decomposition of the electrolytic solution on the positive electrode. Also from such a perspective, the durability of the sodium ion secondary battery including the aforementioned additive is increased.

From the viewpoint of facilitating formation of coating, preferable examples of the additive are saturated cyclic carbonates each including one or two fluoro groups and chain carbonates each including one or two fluoro groups. The additive can contain one of these materials or a mixture of two or more thereof. Among the above materials, for facilitating formation of coating, a saturated cyclic carbonate including one fluoro group and a chain carbonate including one fluoro group are more preferable. The additive is not limited to the aforementioned carbonates as long as the compound provides a similar effect. For example, the compound may include three or four fluoro groups.

In terms of easily forming the coating, preferable examples of the additive include compounds expressed by General Formula (1) or (2) shown below. The additive can include one or a mixture of two or more of the compounds.

[Compound 1]

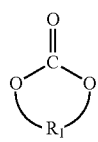

(1)

$R_1$ in General Formula (1) indicates an alkylene group that includes a fluorine atom and has a carbon number of 2 to 4.

[Compound 2]

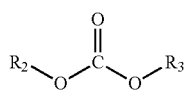

(2)

$R_2$ and $R_3$ in General Formula (2) may be either the same as or different from each other, and each indicate an alkyl group that includes a fluorine atom and has a carbon number of 1 to 3.

Examples of the saturated cyclic carbonates including one or two fluoro groups, which is represented by General Formula (1), are fluoroethylene carbonate (FEC) and difluoroethylene carbonate (DFEC). Among these carbonates, fluoroethylene carbonate (FEC) is most preferable in terms of easily forming the coating. Moreover, examples of the saturated chain carbonate including one or two fluoro groups, which is represented by General Formula (2), are fluoromethyl methyl carbonate, difluoromethyl methyl carbonate, and 1-fluoroethyl methyl carbonate.

Next, a description is given of a sodium ion secondary battery according to an embodiment of the present invention with reference to the drawings. The dimensional ratios in the drawings are exaggerated for convenience of explanation and are sometimes different from actual ratios.

[Configuration of Sodium Ion Secondary Battery]

FIG. 1 shows an example of a sodium ion secondary battery according to an embodiment of the present invention. As shown in FIG. 1, a sodium ion secondary battery 1 of the embodiment has a structure in which a battery element 10 with a positive-electrode tab 21 and a negative-electrode tab 22 attached thereto is sealed within an exterior package 30. In this embodiment, the positive and negative electrode tabs 21 and 22 are led out from the inside of the exterior package 30 in the directions opposite to each other. The positive and negative tabs may be led out from the inside of the exterior package in the same direction, which are not indicated in the drawing. The positive and negative tabs may be respectively attached to later-described positive and negative electrode collectors by ultrasonic welding, resistance welding, or the like, for example.

[Positive and Negative Tabs]

The above-described positive and negative tabs 21 and 22 may be made of aluminum (Al), copper (Cu), titanium (Ti), nickel (Ni), stainless steel (SUS), or alloys thereof. However, the materials of the positive and negative tabs 21 and 22 are not limited to the above materials and can be conventionally-known materials that can be used as tubs for sodium ion secondary batteries. The positive- and negative-electrode tabs may be made of the same material or different materials. As shown in this embodiment, it may be configured that separately prepared tabs are connected to the later-described positive- and negative-electrode collectors. In the case where the later-described positive- and negative-electrode collectors are made of foils, the tabs may be composed of extensions of the foils.

[Exterior Package]

From the viewpoint of miniaturization and weight reduction, preferably, the exterior package 30 is made of a film-shaped package material, for example.

However, the exterior package 30 is not limited thereto and may be made of a conventionally-known material that can be used as an exterior package for sodium ion secondary batteries. In the case of the sodium ion secondary battery is applied to an automobile, it is preferable that the exterior package is made of a polymer-metal composite laminate sheet having excellent heat conduction, for example, in order to efficiently transfer heat from the heat source of the automobile for quickly heating the inside of the battery to a battery operation temperature.

[Battery Element]

As shown in FIG. 1, the battery element 10 in the sodium ion secondary battery 1 of the embodiment includes a plurality of cell layers 14 each composed of a positive electrode 11, an electrolyte layer 13, and a negative electrode 12. The positive electrode 11 has a structure in which a positive-electrode active material layer 11B is formed on each surface of a positive-electrode collector 11A. The negative electrode 12 has a structure in which a negative-electrode active material layer 12B is formed on each surface of a negative-electrode active material layer 12A. On the surface of the negative-electrode active material layer 12B on the electrolyte layer 13 side, a coating 12C is formed.

The positive-electrode active material layer 11B formed on one surface of the positive-electrode collector 11A in one of the positive electrodes 11 is opposite to the negative-electrode active material layer 12B formed on the one surface of the negative-electrode collector 12A in the negative electrode 12 adjacent to the above positive electrode 11 with the electrolyte layer 13 interposed therebetween. In such a manner, the plural positive electrodes, electrolyte layers, and negative electrodes are individually stacked on one another in this order. The positive-electrode active material layer 11B, electrolyte layer 13, coating 12C, and negative-electrode active material layer 12B, which are adjacent to each other, constitute one cell layer 14. In other words, the sodium ion secondary battery 1 includes the plural cell layers 14 stacked on one another to be electrically connected in parallel. The negative-electrode collector 12A which is located in the outermost layer of the battery component 10 is provided with the negative electrode active material layer 12B and coating 12C formed on only one side thereof.

Not shown-insulating layers may be provided at the outer periphery of each cell layer for insulating the positive-electrode collectors from the adjacent negative-electrode collectors. Preferably, the material of the insulating layer formed at the outer periphery of each cell layer can hold electrolyte contained in the electrolyte layer and the like and prevent leakage of the electrolyte. Specifically, the material of the insulating layer may be commodity plastics such as polypropylene (PP), polyethylene (PE), polyurethane (PUR), polyamide resin (PA), polytetrafluoroethylene (PTFE), polyvinylidene difluoride (PVdF), and polystyrene (PS). Moreover, the material may be thermoplastic olefin rubber or silicone rubber.

[Positive-Electrode and Negative-Electrode Collectors]

The positive- and negative-electrode collectors 11A and 12A are made of a conductive material, such as aluminum, copper, or stainless steel (SUS) foil or mesh, for example. However, the material thereof is not limited to these materials and may be a conventionally-known material that can be used in a collector for sodium ion secondary batteries.

[Negative-Electrode Active Material Layer]

Each negative-electrode active material layer 12B contains hard carbon as a negative-electrode active material and may additionally contain a binder or a conductive agent if necessary. The hard carbon refers to non-graphitizable carbon that does not turn into graphite and maintains the random structure thereof even if baked at 3000° C. On the other hand, soft carbon refers to graphitizable carbon that turns into graphite when baked at 3000° C. These carbons are classified as low-crystalline carbon.

In addition to hard carbon, the negative-electrode active material layer may contain another negative-electrode active material as long as the secondary battery can work. Examples of the another negative-electrode active material are graphite as highly-crystalline carbon (natural graphite, artificial graphite, and the like), the aforementioned soft carbon as an example of low-crystalline carbon, and the like. Other examples of the another negative-electrode active material include carbon materials such as carbon black (Ketjenblack, acetylene black, channel black, lamp black, oil-furnace black, thermal black, and the like), fullerene, carbon nanotubes, carbon nanofibers, carbon nanohorns, carbon fibrils, and polyacene. Still other examples of the another negative-electrode active material may include a single element which can be alloyed with sodium, such as Si, Ge, Sn, Pb, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl, oxides containing these elements (silicon oxide (SiO), $SiO_x$, ($0<x<2$), tin dioxide ($SnO_2$), SnO, ($0<x<2$), $SnSiO_3$, and the like), carbides containing the above elements (silicon carbide (SiC) and the like), and the like. Still other examples of the another negative-electrode active material may include metallic materials such as sodium metal, sodium-transition metal composition oxides such as sodium-titanium composite oxides (sodium titanate: $Na_4Ti_5O_{12}$), and the like. However, the another negative-electrode active material is not limited to the aforementioned materials and may be a conventionally-known material that can be used as a negative-electrode active material for sodium ion secondary batteries. These negative-electrode active materials may be used alone or in combination of two or more thereof.

The binder may be thermoplastic resin such as polyvinylidene difluoride (PVdF), polytetrafluoroethylene (PTFE), polyvinyl acetate, polyimide (PI), polyamide (PA), polyvinyl chloride (PVC), poly(methyl acrylate) (PMA), poly (methyl methacrylate) (PMMA), poly(ether nitrile) (PEN), polyethylene (PE), polypropylene (PP), or polyacrylonitrile (PAN). However, the binder is not limited to these materials. For example, thermosetting resin such as epoxy resin, polyurethane resin, and urea resin and rubber materials such as styrene butadiene rubber (SBR) may be used as the binder. Moreover, the binder is not limited to these materials and may be a conventionally-known material that can be used as a binder for sodium ion secondary batteries. These binders may be used alone or in combination of two or more thereof.

The conductive agent can be a carbon material such as carbon black including acetylene black, graphite, and carbon fibers, for example. However, the conductive agent is not limited to the above carbon materials and may be a conventionally-known material that can be used as a conductive agent for sodium ion secondary batteries. These conductive agents can be used alone or in combination of two or more thereof.

[Coating]

The coating 12C includes a composite material containing carbon, oxygen, fluorine and sodium. This coating is formed when the aforementioned additive is reduced and decomposed prior to the reduction and decomposition of the non-aqueous solvent constituting the non-aqueous electrolytic solution in the process of initial charge, for example. Moreover, the coating is called SEI as described above. The components of the coating may be specified by X-ray photoelectron spectrometry (XPS), for example. Herein, the coating 12C may be formed on the entire surface of each negative electrode like the embodiment or may be formed on part of the surface thereof (not shown). For example, in a negative electrode having a structure in which the negative-electrode collector is covered with the negative-electrode active material layer containing the negative-electrode active material, the coating only needs to be formed on all or part of the surface of the negative-electrode active material layer. Moreover, in a negative electrode containing granular negative-electrode active material, for example, the coating only needs to be formed on all or part of the surface of the negative-electrode active material.

[Positive-Electrode Active Material Layer]

The positive-electrode active material layer 11B includes a positive-electrode active material containing one type or two or more types of positive-electrode materials capable of storing and releasing sodium and may additionally contain a binder or a conductive agent if necessary. The binder and conductive agent may be the same materials as described above.

As the positive material capable of storing and releasing sodium, sodium-containing compounds are preferred from the viewpoint of the capacity and output characteristics of the battery, for example. Examples of the sodium-containing compounds are sodium-iron oxide ($NaFeO_2$), sodium-cobalt oxide ($NaCoO_2$), sodium-chromium oxide ($NaCrO_2$), sodium-manganese oxide ($NaMnO_2$), sodium-nickel oxide (NaNiO$_2$), sodium nickel titanium oxide (NaNi$_{1/2}$Ti$_{1/2}$O$_2$), sodium nickel manganese oxide (NaNi$_{1/2}$Mn$_{1/2}$O$_2$), sodium iron manganese oxide (Na$_{2/3}$Fe$_{1/3}$Mn$_{2/3}$O$_2$), sodium nickel cobalt manganese oxide (NaNi$_{1/3}$Co$_{1/3}$Mn$_{1/3}$O$_2$), and solid solution and non-stoichiometric compounds thereof. In addition, examples of the sodium-containing compounds can include sodium manganese oxide (NaMn$_2$O$_4$) and sodium nickel manganese oxide (NaNi$_{1/2}$Mn$_{3/2}$O$_2$). Other examples of the sodium-containing compounds include olivine type materials such as sodium iron phosphate compound (NaFePO$_4$), sodium manganese phosphate compound (NaMnPO$_4$), and sodium cobalt phosphate compound (NaCoPO$_4$). Still other examples of the sodium-containing compounds include olivine fluoride type materials such as Na$_2$FePO$_4$F, Na$_2$MnPO$_4$F, and Na$_2$CoPO$_4$F and include organic type active materials such as polymer radical compounds and π conjugated polymers, which may be applied to organic radical batteries. Furthermore, the sodium-containing compounds may be elements forming compounds with sodium, such as solid sulfur or sulfur-carbon composite material. However, the sodium-containing compounds are not limited to the aforementioned materials and may include conventionally-known materials such as other sodium-containing transition metal oxides, sodium-containing transition metal sulfides, and sodium-containing transition metal fluorides as long as the material is capable of storing and releasing sodium.

The positive-electrode active material may be an active material other than the aforementioned active materials and may be sodium metal, for example. In the case of using sodium metal as the active material, as a battery, the sodium metal side serves as the negative electrode while the hard carbon side thereof serves as the positive electrode since the sodium metal has a lower potential than hard carbon. Even if each active material differs in optimal particle size appropriate for development of the specific effect thereof, the active materials having different particle sizes appropriate for development of the specific effects may be mixed, and it is unnecessary to equalize the particle sizes of all the active materials. In the case of using hard carbon having a granular form as the negative-electrode active material, the average particle size only needs to be equal to the average particle size of the negative-electrode active material contained in conventionally-known negative-electrode active materials and is not particularly limited. From the viewpoint of increasing the output, the average particle size of hard carbon is preferably in a range of 1 to 20 μm. However, the particle size is not limited to the above range and may be out of the range as long as the operational effect of the embodiment can be effectively exerted.

[Electrolyte Layer]

The aforementioned electrolyte layer 13 may have a layer structure including non-aqueous electrolytic solution held by later-described separators and polymer gel electrolyte, for example. Moreover, the electrolyte layer 13 may have a laminated structure composed of polymer gel electrolyte. Preferably, the non-aqueous electrolytic solution is a solution used in sodium ion secondary batteries, for example. Specifically, the non-aqueous electrolytic solution has a structure in which sodium salt and the aforementioned additive are dissolved in a non-aqueous solvent as an organic solvent. The content of the additive in the non-aqueous electrolytic solution, which is not particularly limited, is preferably 0.5% by volume to 10% by volume inclusive, more preferably 0.5% by volume to 5% by volume inclusive, and still more preferably 0.5% by volume to 2% by volume inclusive. By setting the content of the additive within the above ranges, it is possible to obtain a suitable amount of coating for increasing the durability of the battery.

Examples of the aforementioned sodium salt may include at least one type of sodium salt selected from inorganic acid anionic salts such as NaPF$_6$, NaBF$_4$, NaClO$_4$, NaAsF$_6$, NaTaF$_6$, NaAlCl$_4$, and Na$_2$B$_{10}$Cl$_{10}$ and organic acid anionic salts such as NaCF$_3$SO$_3$, Na(CF$_3$SO$_2$)$_2$N, and Na(C$_2$F$_5$SO$_2$)$_2$N. The non-aqueous solvent may be a non-aqueous solvent containing saturated cyclic carbonate or a non-aqueous solvent containing saturated cyclic carbonate and chain carbonate, for example.

The saturated cyclic carbonate can be ethylene carbonate (EC), propylene carbonate (PC), butylene carbonate (BC), and the like. The chain carbonate can be dimethyl carbonate (DMC), methylethyl carbonate (EMC), diethyl carbonate (DEC), and the like. The aforementioned non-aqueous solvent may contain another non-aqueous solvent and may be composed of one type or a mixture of two or more types selected from: ethers such as tetrahydrofuran, 2-methyltetrahydrofuran, 1,4-dioxane, 1,2-dimethoxyethane, and 1,2-dibutoxyethane; lactones such as γ-butyrolactone; nitrils such as acetonitril; esters such as methyl propionate; amides such as dimethylformamide; methyl acetate; and methyl formate.

Each separator can be composed of microporous membrane of polyolefin such as polyethylene or polypropylene, for example. The polymer gel electrolyte can contain a polymer constituting the polymer gel electrolyte and a non-aqueous electrolytic solution in a conventionally-known ratio. The polymer gel electrolyte may include an ion-conducting solid polymer electrolyte containing the aforementioned electrolytic solution generally used in sodium ion secondary batteries but is not limited to such an electrolyte. The polymer gel electrolyte may have a structure in which the same electrolytic solution is held in the skeleton of a polymer not having sodium ion conductivity.

The polymer which is contained in the polymer gel electrolyte and does not have sodium ion conductivity can be polyvinylidene difluoride (PVdF), polyvinyl chloride (PVC), polyacrylonitrile (PAN), poly(methyl methacrylate) (PMMA), or the like, for example, but is not limited to these materials. Herein, PAN and PMMA, which can be used as the aforementioned ion-conducting polymer, have little ion conductivity and are exemplified as the polymer that is contained in the polymer gel electrolyte and does not have sodium ion conductivity.

The solid polymer electrolyte can have a structure in which the aforementioned sodium salt is dissolved in polyethylene oxide (PEO), polypropylene oxide (PPO), or the like, for example. From the viewpoint of reducing internal resistance, it is more preferable that each electrolyte layer is thinner. For example, the thickness of each electrolyte layer is normally 1 to 100 μm and preferably 5 to 50 μm.

Next, a description is given of an example of the method of manufacturing the sodium ion secondary battery in the aforementioned embodiment.

First, the positive electrodes are manufactured. In the case of using a granular positive-electrode active material, for example, the positive-electrode active material is mixed with the conductive agent, binder, and solvent viscosity modifier if necessary to produce a positive-electrode mixture. The positive-electrode mixture is then applied to a positive-electrode collectors, dried, and compression-molded. The positive-electrode active material layers are thus formed.

Moreover, the negative electrodes are manufactured. In the case of using a granular negative-electrode active material, for example, the negative-electrode active material is mixed with the conductive agent, binder, and solvent viscosity modifier if necessary to produce a negative-electrode mixture. The negative-electrode mixture is then applied to the negative-electrode collectors, dried, and compression-molded. The negative-electrode active material layers are thus formed.

Herein, positive-electrode tabs and negative-electrode tabs are attached to the positive and negative electrodes, respectively. Thereafter, the positive electrodes, separators, and negative electrodes are stacked on one another. Furthermore, the stacking product is sandwiched by polymer-metal composite laminate sheet, and the outer periphery thereof is thermally fused except one side to form a pouch-like exterior package.

Next, the non-aqueous electrolytic solution containing the sodium salt such as sodium hexafluorophosphate, the non-aqueous solvent such as propylene carbonate, and the additive such as fluoroethylene carbonate is prepared. The prepared non-aqueous electrolytic solution is injected into the exterior package through the opening thereof. The opening of the exterior package is then thermally-fused to be sealed. A laminate-type sodium ion secondary battery is completed in such a manner.

When the sodium ion secondary battery described above is charged, sodium ions are released from the positive-electrode active material layers and are then absorbed into the negative-electrode active material layers through the electrolyte layers. When the sodium ion secondary battery is discharged, sodium ions are released from the negative-electrode active material layers and then are absorbed into the positive-electrode active material layers through the electrolyte layers. Moreover, especially in the initial charge time, SEI coating derived from the additive is formed on the negative electrode. In such a manner, the additive contained in the non-aqueous electrolytic layer acts on the negative electrodes to form the coating, so that the decomposition of the non-aqueous solvent in the negative electrode can be reduced. This reduces generation of sodium ethoxide and the like and therefore reduces decomposition of the non-aqueous solvent in the positive electrode. Accordingly, the reduction in capacity of the sodium ion secondary battery is reduced.

EXAMPLES

Hereinafter, the present invention is described in more detail using examples and comparative examples. However, the present invention is not limited to these examples.

Examples 1-1 to 1-4 and 2-1, Comparative Examples 1-1 to 3-1

Hard carbon (Carbotron P of KUREHA corporation), polyvinylidene difluoride (PVdF) as the binder, N-methyl-2-pyrollidone (NMP) as the solvent viscosity modifier were mixed by hand to obtain a working electrode mixture. The obtained working electrode mixture was applied to copper foil as a working-electrode collector and then dried in a vacuum dryer at 80° C. The product was punched into a circle with a diameter of 10 mm, thus obtaining a working electrode. Hard carbon and polyvinylidene difluoride were mixed in a mass ratio of hard carbon to polyvinylidene difluoride of 90/10. On the other hand, the counter electrode was made of sodium metal foil. The separator was made of a glass filter with a thickness of 0.38 mm. The working electrode and counter electrode were laid on each other with the 0.38 mm thick-glass filter interposed therebetween in the order of the working electrode, separator, and counter electrode into a cell layer of a three-layer structure. The obtained cell layer was placed in a case of a coin battery, and a gasket is attached thereto to maintain insulation between the electrodes. The non-aqueous electrolytic solution was injected using a syringe, and a spring and a spacer were stacked thereon. Furthermore, the other case was laid thereon for caulking. A sodium ion secondary battery was thus obtained.

In the non-aqueous electrolytic solution of Example 1-1, sodium perchlorate ($NaClO_4$) as the electrolytic salt was dissolved to a concentration of 1 mol/L in a solvent of propylene carbonate (PCC) as the non-aqueous solvent and fluoroethylene carbonate (FEC) as the additive that were mixed in a volume ratio of PC/FEC of 99.5/0.5. In the non-aqueous electrolytic solution used in Example 1-2, $NaClO_4$ as the electrolytic salt was dissolved to a concentration of 1 mol/L in a solvent of PC as the non-aqueous solvent and FEC as the additive that were mixed in a volume ratio of PC/FEC of 99/1. In the non-aqueous electrolytic solution used in Example 1-3, $NaClO_4$ as the electrolytic salt was dissolved to a concentration of 1 mol/L in a solvent of PC as the non-aqueous solvent and FEC as the additive that were mixed in a volume ratio of PC/FEC of 98/2. In the non-aqueous electrolytic solution used in Example 1-4, $NaClO_4$ as the electrolytic salt was dissolved to a concentration of 1 mol/L in a solvent of PC as the non-aqueous solvent and FEC as the additive that were mixed in a volume ratio of PC/FEC of 90/10. In the non-aqueous electrolytic solution used in Example 2-1, sodium hexafluorophosphate ($NaPF_6$) as the electrolytic salt was dissolved to a concentration of 1 mol/L in a solvent of PC as the non-aqueous solvent and FEC as the additive that were mixed in a volume ratio of PC/FEC of 98/2.

In the non-aqueous electrolytic solution used in Comparative Example 1-1, $NaClO_4$ as the electrolytic salt was dissolved to a concentration of 1 mol/L in PC as the non-aqueous solvent (with no addition of FEC). In the non-aqueous electrolytic solution used in Comparative Example 2-1, $NaPF_6$ as the electrolytic salt was dissolved to a concentration of 1 mol/L in PC as the non-aqueous solvent (with no addition of FEC). In the non-aqueous electrolytic solution used in Comparative Example 3-1, sodium bis(trifluoromethanesulfonyl)amide (NaTFSA) as the electrolytic salt was dissolved to a concentration of 1 mol/L in PC as the non-aqueous solvent (with no addition of FEC).

Example 3-1 and Comparative Example 4-1

$NaNi_{0.5}Mn_{0.5}O_2$ as the positive-electrode active material, polyvinylidene difluoride (PVdF) as the binder, acetylene black as the conductive agent, and N-methyl-2-pyrrolidone (NMP) as the solvent viscosity modifier were mixed by hand to obtain a positive-electrode mixture. The obtained positive-electrode mixture was applied to aluminum foil as the positive-electrode collector and then dried in a vacuum dryer at 90° C. The product was punched into a circle with a diameter of 10 mm, thus obtaining a positive electrode. $NaNi_{0.5}Mn_{0.5}O_2$, polyvinylidene difluoride, and acetylene black were mixed in a mass ratio of $NaNi_{0.5}Mn_{0.5}O_2$, polyvinylidene difluoride, and acetylene black of 80/10/10. On the other hand, the negative electrode was made of sodium metal foil. The separator was made of glass filter with a thickness of 0.38 mm. The positive and negative electrodes were laid on each other with the 0.38 mm thick glass filter interposed therebetween in the order of the positive electrode, separator, and negative electrode into a cell layer of a three-layer structure. The obtained cell layer was placed in a case of a coin battery, and a gasket is attached thereto to maintain insulation between the electrodes. The non-aqueous electrolytic solution described later was injected using a syringe, and a spring and a spacer were stacked thereon. Furthermore, the other case was laid thereon for caulking. A sodium ion secondary battery was thus obtained.

In the non-aqueous electrolytic solution used in Example 3-1, $NaClO_4$ as the electrolytic salt was dissolved to a concentration of 1 mol/L in a solvent of PC as the non-aqueous solvent and FEC as the additive that were mixed in a volume ratio of PC/FEC of 90/10. In the non-aqueous electrolytic solution used in Comparative Example 4-1, $NaClO_4$ as the electrolytic salt was dissolved to a concentration of 1 mol/L in PC as the non-aqueous solvent (with no addition of FEC).

[Cyclic Voltammetry Test]

The oxidative decomposition potentials of the non-aqueous electrolytic solutions used in Example 3-1 and Comparative Example 4-1 were measured by cyclic voltammetry. The working electrode was an aluminum foil with a diameter of 10 mm, and the negative and reference electrodes were sodium metal. The scanning speed at measurement was set to 0.20 mV/s, and the range of potential was set to 1.5 to 3.8 V vs.$Na/Na^+$. The obtained results were shown in FIG. 2.

Figure 3:
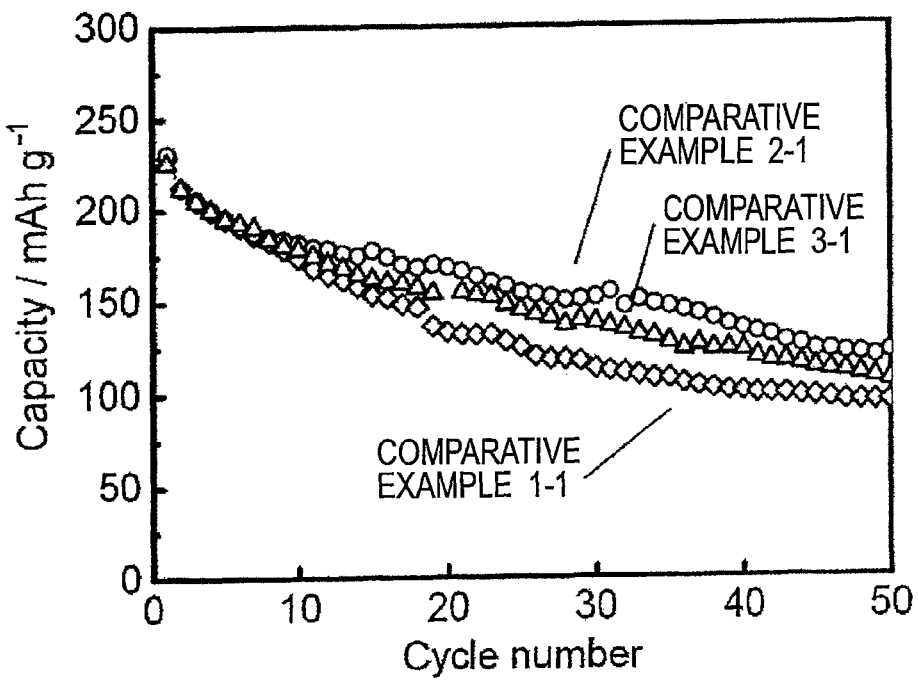
FIG. 3 is a graph showing the capacity of each example after each charge-discharge cycle.
Figure 4:
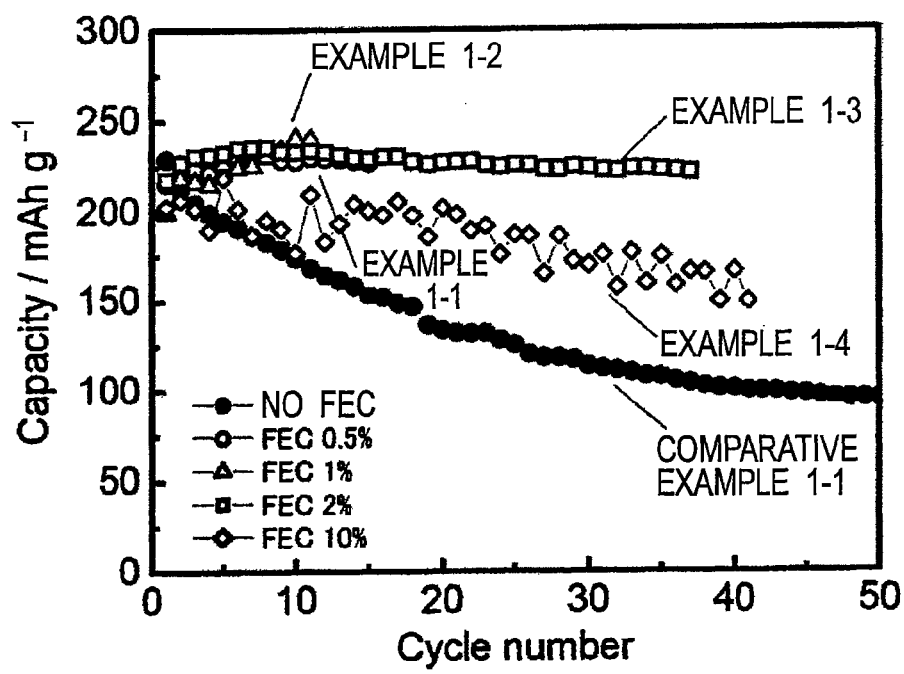
FIG. 4 is a graph showing the capacity of each example after each charge-discharge cycle.
Figure 5:
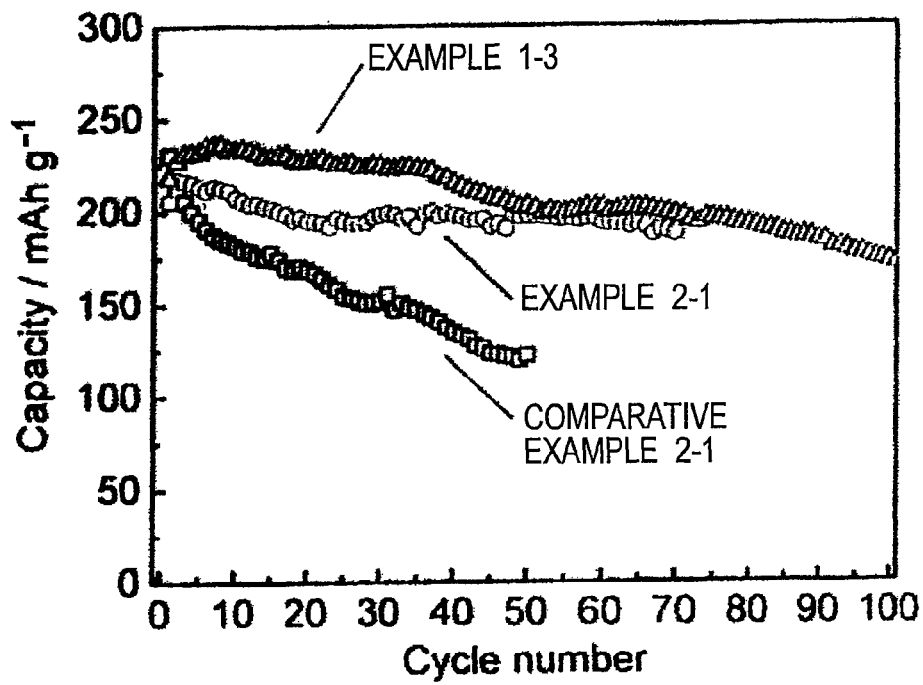
FIG. 5 is a graph showing the capacity of each example after each charge-discharge cycle.

The obtained hard carbon/sodium ion secondary battery was charged and discharge as follows. The sodium ion secondary battery was connected to a charge/discharge tester (HJ0501SM8A of Hokuto-Denko corporation). The sodium ion secondary battery was charged at constant current with a current density of 25 mA/g until the potential difference reached 0 V and then discharged at constant current so that the potential difference reached 2 V. Herein, this charge-discharge cycle is referred to as one cycle. 1 to 50 charge-discharge cycles were performed under the same charge-discharge conditions, and the capacity was measured after each cycle. About forty charge-discharge cycles were performed in some examples, and about 100 cycles were performed in some examples. The obtained results are shown in FIGS. 3 to 5. The temperature was maintained at about 25° C. during the charge-discharge cycles.

Figure 6:
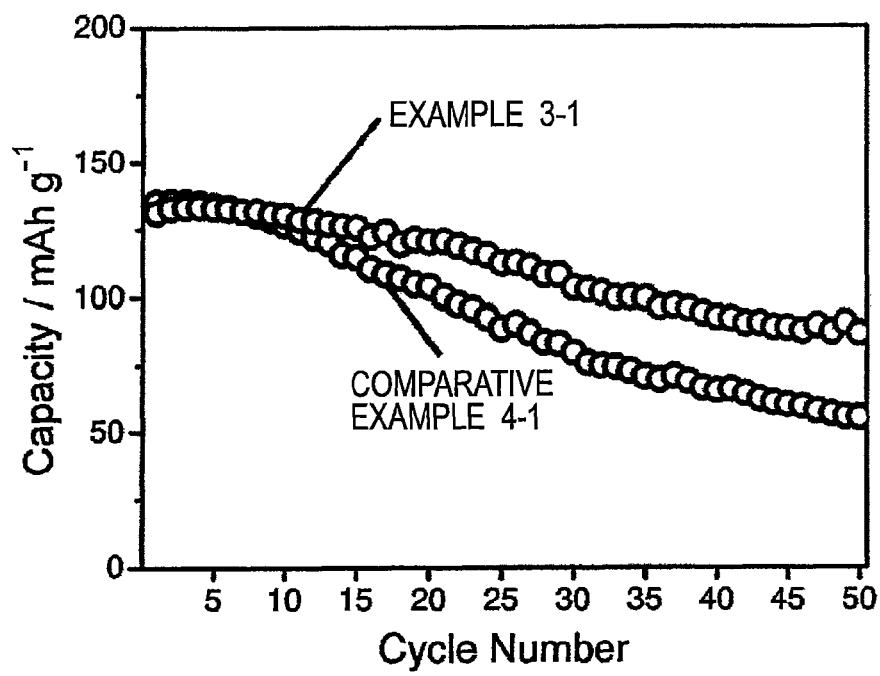
FIG. 6 is a graph showing the capacity of each example after each charge-discharge cycle.
Figure 7:
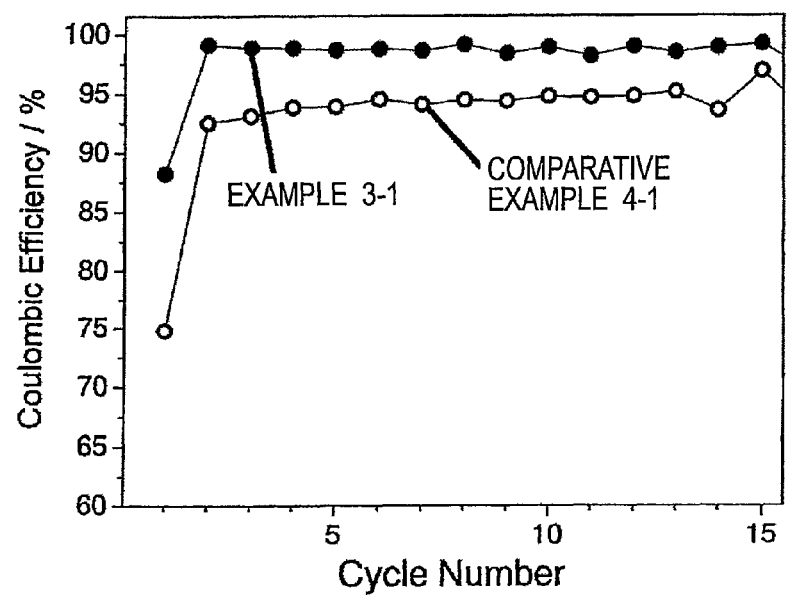
FIG. 7 is a graph showing the charge-discharge efficiency of each example after each charge-discharge cycle.

The charge/discharge test of the $NaNi_{1/2}Mn_{1/2}O_2$ sodium secondary battery was performed as follows. The sodium ion secondary battery was connected to a charge/discharge tester (HJ0501SM8A of Hokuto-Denko corporation). The sodium ion secondary battery was charged at constant current with a current density of 23.9 mA/g until the potential difference reached 3.8 V and was then discharged at constant current so that the potential difference reached 2.2 V. Herein, this cycle of charge and discharge is referred to as one cycle. 1 to 50 charge-discharge cycles were performed under the same charge-discharge conditions, and the capacity was calculated after each cycle. The obtained results are shown in FIG. 6. Furthermore, the charge/discharge efficiency was calculated after each cycle. The obtained results are shown in FIG. 7. The temperature was maintained at about 25° C. during the charge-discharge cycles.

Figure 2:
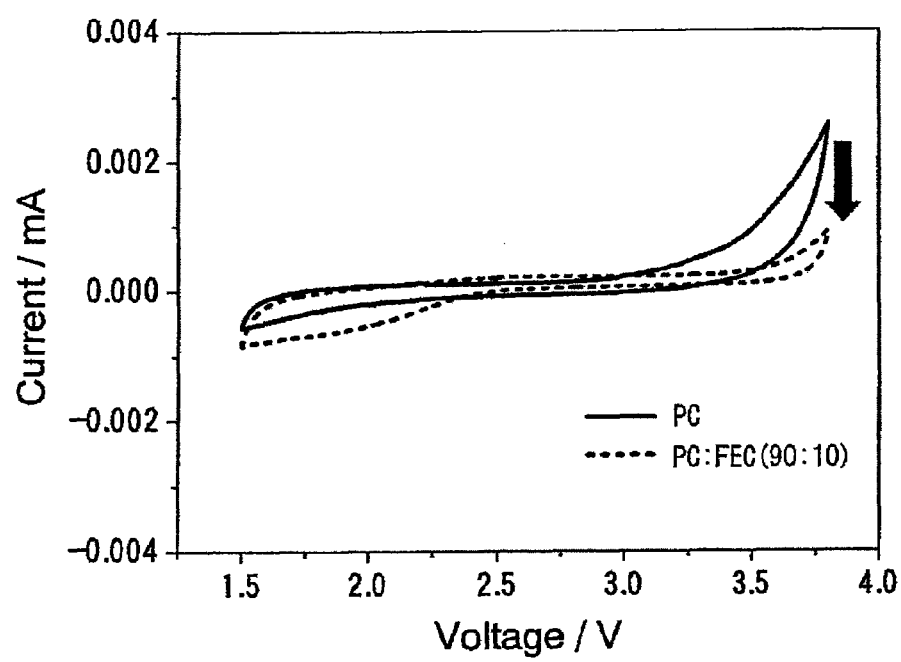
FIG. 2 is a graph showing results of cyclic voltammetry tests of each example.

In FIG. 2, a current peak due to oxidation current is clearly observed around 3V from the CV curve for PC alone, which is indicated by a solid line. On the other hand, from the CV curve for PC added with FEC, which is indicated by a dashed line, reduction in oxidation current is observed as indicated by an arrow in the drawing. These results are considered to be because of reduction in oxidative decomposition reaction of the decomposition product of the electrolytic solution generated in the counter electrode side.

The results shown in FIGS. 3 to 5 revealed that, compared to the sodium ion secondary batteries of Comparative Examples 1-1, 2-1, and 3-1, the reduction in capacity of the sodium ion secondary batteries of Examples 1-1 to 1-4 and 2-1 was reduced, and the durability thereof was increased.

FIG. 3 shows a relationship between the type of the electrolytic salt and battery capacity. FIG. 3 reveals that in the absence of the additive of the present invention, the capacity is rapidly reduced as the number of cycles increases.

FIG. 4 shows a relationship between the amount of the additive and battery capacity. FIG. 4 reveals that addition of 0.5 to 10% by volume FEC increases the durability. Especially when 0.5 to 2% by volume FEC is added, the reduction in capacity is hardly observed even after 50 cycles, and the durability is considerably increased.

FIG. 5 shows a relationship between the combination of the additive and electrolytic salt and the battery capacity. FIG. 5 reveals that in the case of the combination of FEC and $NaClO_4$, the reduction in capacity is hardly observed and the durability is significantly increased.

FIG. 6 reveals that Example 3-1 of PC added with FEC has the cycle characteristics definitely improved compared to Comparative Example 4-1 of only PC. Moreover, FIG. 7 reveals that the charge-discharge efficiency of each cycle can be increased by about 7%.

Moreover, the negative electrode surfaces of the sodium ion secondary batteries of Examples 1-1 to 1-4 and 2-1 were investigated by X-ray photoelectron spectrometry (XPS). As a result, carbon, oxygen, fluorine, and sodium were detected. This reveals that coatings composed of a composite material containing the above elements are formed on the negative-electrode surfaces.

Figure 8:
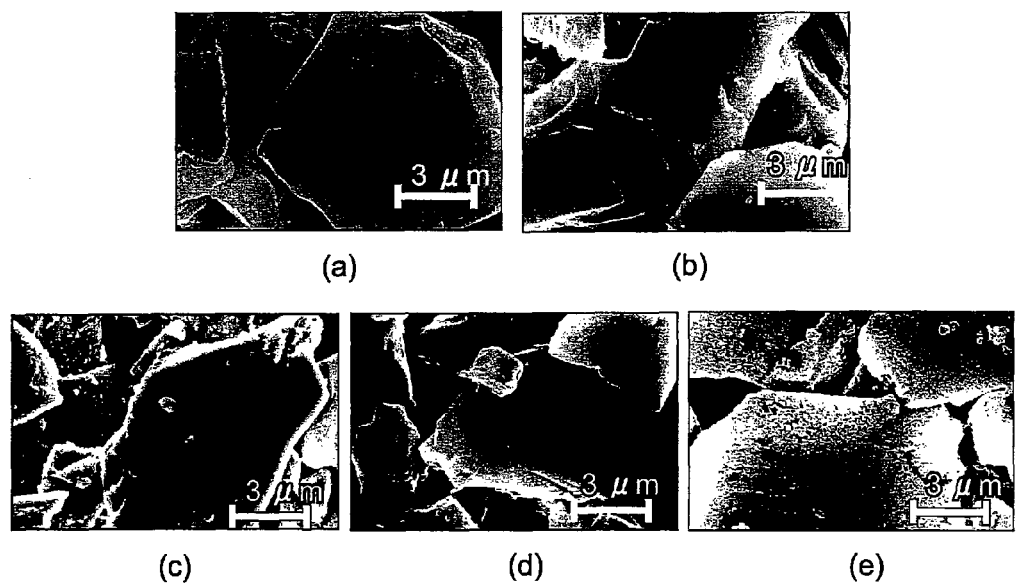
FIGS. 8(a) to 8(e) are scanning electron micrographs of Referential example, Comparative example 1-1, and Examples 1-1, 1-3 and 1-4, respectively.

Moreover, for studying the factor improving the reduction in capacity, the negative-electrode surfaces of the sodium ion secondary batteries of Examples after charge and discharge were observed by a scanning electron microscope (SEM). This SEM observation was performed under the conditions including: a magnification of 10000× and an acceleration voltage of 5 kV. As the referential example, the surface of hard carbon itself was observed under the same conditions by the SEM. Part of the obtained results is shown in FIG. 8. FIG. 8(a) is an SEM image of the referential example, and FIGS. 8(b) to 8(e) are SEM images of the negative-electrode surfaces of the sodium ion secondary batteries corresponding to Comparative Example 1-1 and Example 1-1, 1-3, and 1-4, respectively.

As shown in FIG. 8, in Examples 1-1, 1-3, and 1-4, coatings are observed on the negative-electrode surfaces. On the other hand, no coating is observed in Comparative Example 1-1 with no addition of FEC. From those results, it is revealed that the amount of produced coating has a tendency to increase as the amount of additive increases. Especially in Example 1-4, an increase in amount of produced coating is definitely observed.

Based on the above results, it is considered that coating is formed because reduction decomposition due to the added FEC occurs on the negative-electrode surface, and the formed coating is suggested to reduce decomposition of the non-aqueous solvent. It is then suggested that the capacity reduction of the sodium ion secondary battery composed of the aforementioned positive electrode, electrolytic solution, and the like can be reduced to increase the durability of the sodium ion secondary battery. As this coating can be a resistance component if being excessively formed, it is suggested that the formation of excessive coating can cause reduction in capacity.

As described above, it is suggested that addition of FEC can reduce the reduction in capacity of the sodium ion secondary battery. Such a phenomenon is suggested to involve the coating formed on the negative-electrode surface. In other words, it is found that the cycle characteristics of the sodium ion secondary battery, that is, the durability thereof can be improved by using of the additive for sodium ion secondary batteries of the present invention.

The entire contents of Japanese Patent Applications No. 2011-070344 (filed on Mar. 28, 2011), No. 2011-164334 (filed on Jul. 27, 2011), and No. 2012-020828 (filed on Feb. 2, 2012) are incorporated herein by reference.

Hereinabove, the contents of the present invention are described along the embodiments and examples. However, it is obvious for those skilled in the art that the present invention is not limited to the above description and can be variously changed and modified.

For example, the additive for sodium ion secondary batteries of the present invention only needs to be composed of a saturated cyclic carbonate including a fluoro group or a chain carbonate including a fluoro group, and the other configuration is not particularly limited. Moreover, the sodium ion secondary battery of the present invention only needs to include the above-described predetermined non-aqueous electrolytic solution and the predetermined negative electrode, and the other configuration thereof is not particularly limited. For example, the present invention can be applied to not only the above-described laminate-type batteries and coin-type (button-type) batteries but also conventionally-known styles and structures such as can-type batteries. Moreover, the present invention is applicable to not only the above-described stacking type (flat type) batteries but also conventionally-known styles and structures such as winding (cylindrical) batteries, for example. Furthermore, in terms of the electrical connection within sodium ion secondary batteries, that is, the electrode structure thereof, the present invention is applicable to not only ordinary batteries such as the inner parallel connection type described above but also conventionally-known styles and structures such as bipolar batteries of inner serial connection type. Generally, the battery element of a bipolar battery has a structure in which plural bipolar electrodes and plural electrolyte layers are stacked on each other. In each bipolar electrode, a negative-electrode active material layer is formed on one surface of the collector, and a positive-electrode active material is formed on the other surface.

INDUSTRIAL APPLICABILITY

According to the present invention, the additive for sodium ion secondary batteries includes a saturated cyclic carbonate having a fluoro group or a chain carbonate including a fluoro group. This can increase the durability of the sodium ion secondary batteries.

EXPLANATION OF REFERENCE NUMERALS AND SYMBOLS

1: SODIUM ION SECONDARY BATTERY
10: BATTERY ELEMENT
11: POSITIVE ELECTRODE
11A: POSITIVE-ELECTRODE COLLECTOR
11B: POSITIVE-ELECTRODE ACTIVE MATERIAL LAYER
12: NEGATIVE ELECTRODE
12A: NEGATIVE-ELECTRODE COLLECTOR
12B: NEGATIVE ELECTRODE ACTIVE MATERIAL LAYER
12C: COATING
13: ELECTROLYTE LAYER
14: CELL LAYER
21: POSITIVE-ELECTRODE TAB
22: NEGATIVE-ELECTRODE TAB
30: EXTERIOR PACKAGE

The invention claimed is:

1. A sodium ion secondary battery, comprising:
a non-aqueous electrolytic solution that includes an additive for a sodium ion secondary battery comprising fluoroethylene carbonate, and one of a non-aqueous solvent containing a saturated cyclic carbonate and a non-aqueous solvent containing a saturated cyclic carbonate and a chain carbonate;
a positive electrode that includes a positive-electrode active material capable of storing and releasing a sodium; and
a negative electrode that includes a coating formed on a surface of the negative electrode, the coating containing a composite material containing carbon, oxygen, fluorine and sodium, and that includes a negative-electrode active material containing a hard carbon,
wherein a content of the additive for a sodium ion secondary battery in the non-aqueous electrolytic solution is in a range from 0.5% by volume to 10% by volume inclusive.

2. A sodium ion secondary battery, comprising:
a non-aqueous electrolytic solution that includes an additive for a sodium ion secondary battery containing fluoroethylene carbonate, and one of a non-aqueous solvent containing a saturated cyclic carbonate and a non-aqueous solvent containing a saturated cyclic carbonate and a chain carbonate;
a positive electrode that includes a positive-electrode active material containing a hard carbon; and
a negative electrode that includes a coating formed on a surface of the negative electrode, the coating containing a composite material containing carbon, oxygen, fluorine and sodium, and that includes a negative-electrode active material containing a metal sodium,
wherein a content of the additive for a sodium ion secondary battery in the non-aqueous electrolytic solution is in a range from 0.5% by volume to 10% by volume inclusive.

* * * * *